United States Patent [19]

Ishioka

[11] Patent Number: 6,157,704
[45] Date of Patent: Dec. 5, 2000

[54] SUBSCRIBER LINE TEST SYSTEM FOR ACCESS NETWORK

[75] Inventor: Yuzuru Ishioka, Kanagawa, Japan

[73] Assignee: Fujitsu Limited, Kawasaki, Japan

[21] Appl. No.: 09/338,627

[22] Filed: Jun. 23, 1999

[30] Foreign Application Priority Data

Oct. 1, 1998 [JP] Japan .................................. 10-279932

[51] Int. Cl.[7] .................................................. H04M 1/24
[52] U.S. Cl. .................................. 379/27; 379/29; 379/6
[58] Field of Search .................................. 379/1, 2, 5, 6, 379/8, 9, 10, 12, 18, 22, 23, 24, 26, 27, 29

[56] References Cited

U.S. PATENT DOCUMENTS

| | | | |
|---|---|---|---|
| 5,623,498 | 4/1997 | Pannone | 379/29 |
| 5,805,668 | 9/1998 | Kim | 379/29 |
| 5,859,895 | 1/1999 | Pomp et al. | 379/29 |
| 5,946,372 | 8/1999 | Jones et al. | 379/29 |
| 5,974,115 | 10/1999 | Chan et al. | 379/29 |
| 6,034,948 | 3/2000 | Nakamura et al. | 379/29 |
| 6,049,591 | 4/2000 | Nishi | 379/29 |

FOREIGN PATENT DOCUMENTS 58-207760  12/1983  Japan .
2-109452   4/1990   Japan .
2-161860   6/1990   Japan .

*Primary Examiner*—Curtis A. Kuntz
*Assistant Examiner*—Rexford Barnie
*Attorney, Agent, or Firm*—Helfgott & Karas, P.C.

[57] ABSTRACT

A remote terminal in an access network where a plurality of exchange and subscriber telephone sets are connected, is provided with an incoming call prohibition control unit for transmitting an incoming call prohibition signal or an incoming call prohibition cancellation signal. The exchange is provided with an incoming call prohibition signal detector unit for receiving the incoming call prohibition signal and the incoming call prohibition cancellation signal, converting the incoming call prohibition signal and the incoming call prohibition cancellation signal to an incoming call prohibition command and an incoming call prohibition cancellation command, respectively, and outputting them to a monitor control unit. The signals from the incoming call prohibition control unit are transmitted to the incoming call prohibition signal detector unit through a transmission line (transmitting apparatus). For a method for transmitting the incoming call prohibition signal or an incoming call prohibition cancellation signal, control messages in a V5.2 interface, tone signals or E1 frame bits can be used.

12 Claims, 15 Drawing Sheets

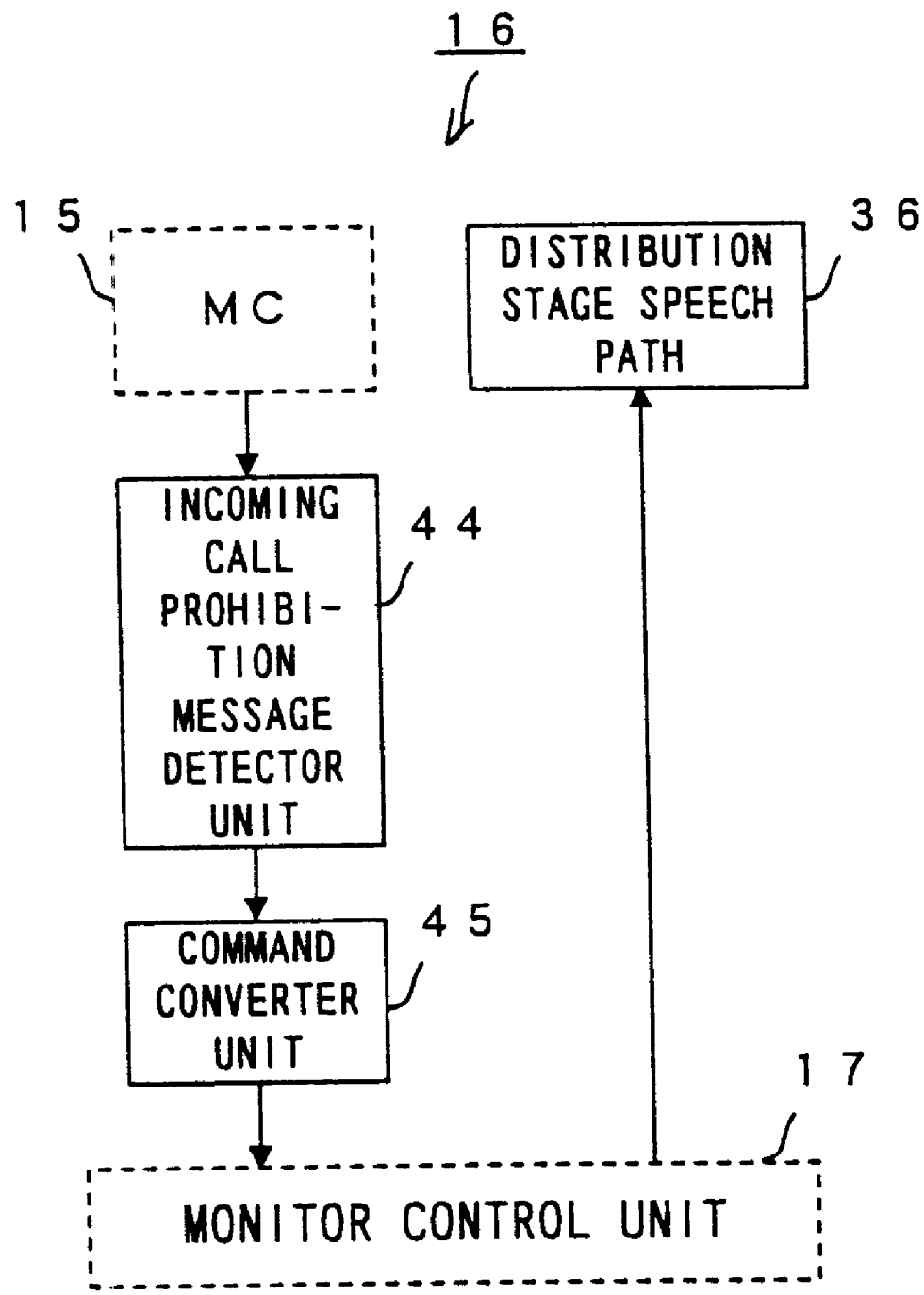
F I G. 7

FIG. 8A 2.048kb/s Frame:
Timeslot 0 - 31
Frame #0 - #15

| #0 | 0 | 1~15 | 16 | 17~31 |
|---|---|---|---|---|
| #15 | | | 0 | |

Control Protocol Messages:

| 16 | PSTN Sinalling | Control Protocol | Port Control | Protocol Discriminator | | |
|---|---|---|---|---|---|---|
| | | | | Layer 3 address | (indicates a line ID) | |
| | | | | Message Type | | |
| | | | | Control-function-lelement | Activate access | 0000001 |
| | | | | | : | |
| | | | | | Access deactivate | 0000110 |
| | | | | | Unblock | 0010001 |
| | | | | | : | |
| | | | | | D-channel Unblock | 0011000 |
| | | | | | INCOMING CALL PROHIBITION | 0011001 |
| | | | | | INCOMING CALL PROHIBITION CANCELLATION | 0011010 |
| | | | | Performance-grading | | |
| | | | Port Control Ack | | | |
| | | Common Control | | | | |
| | | Common Control Ack | | | | |
| | BCC Protocol | | | | | |
| | Protection Protocol | | | | | |
| | Link Control Protocol | | | | | |

INSERTION POSITION OF A MESSAGE WHICH IS USED IN THE PRESENT INVENTION

ANY VALUE BETWEEN "0011001" AND "111111" CAN BE USED FOR A BIT STRING WHICH IS USED FOR INCOMING CALL PROHIBITION/CALL PROHIBITION CANCELLATION

FIG. 8B

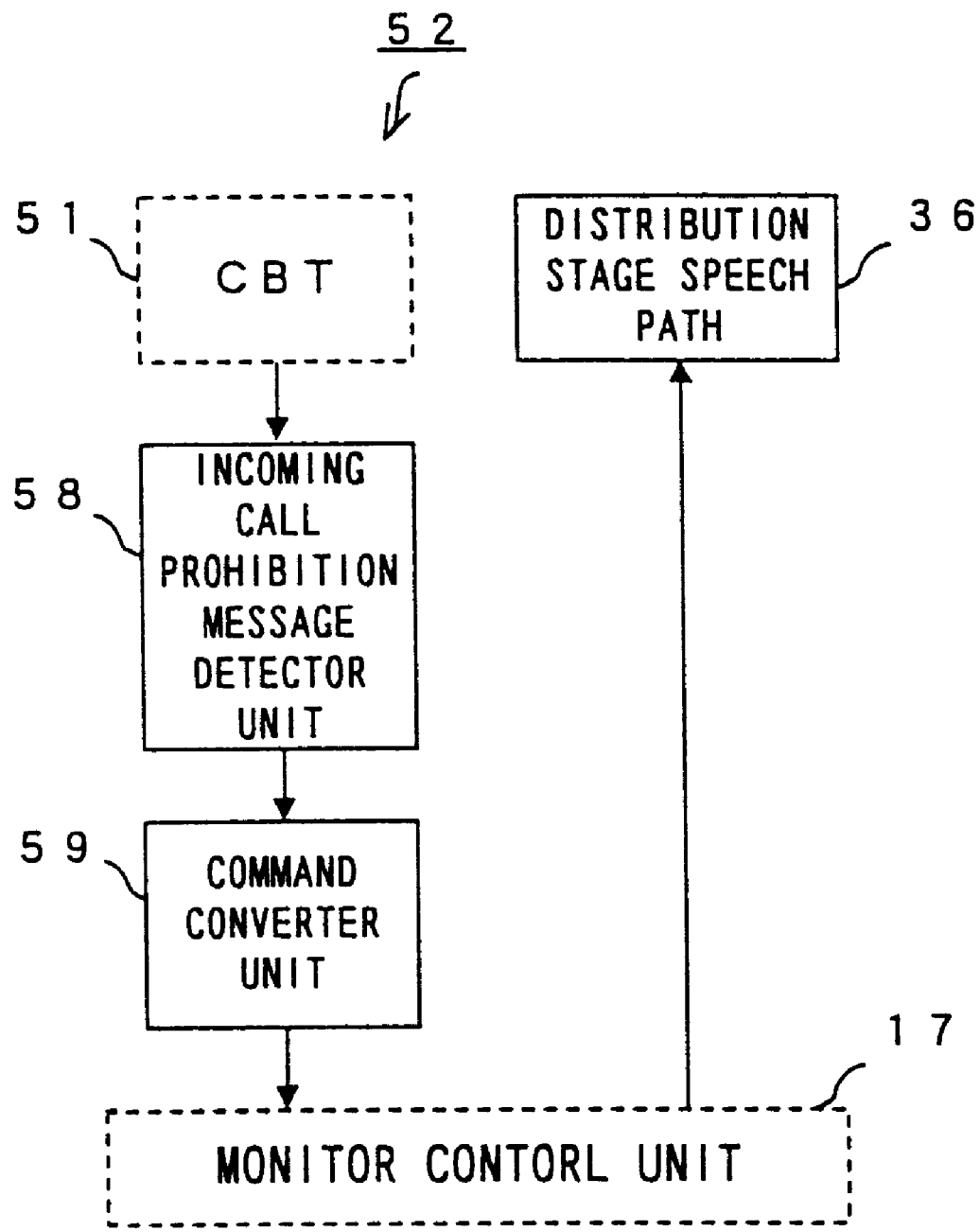
F I G. 1 1

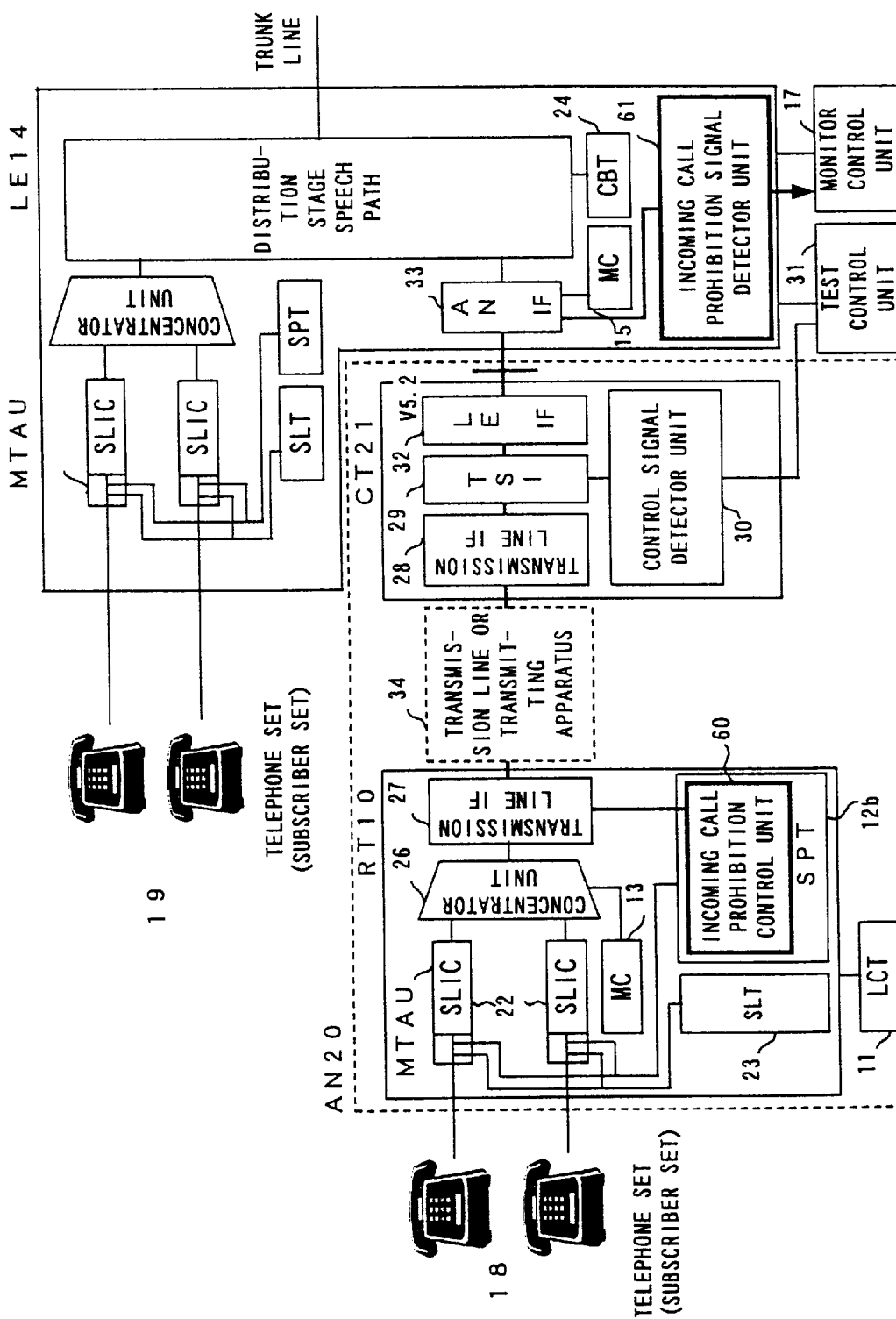
F I G. 12

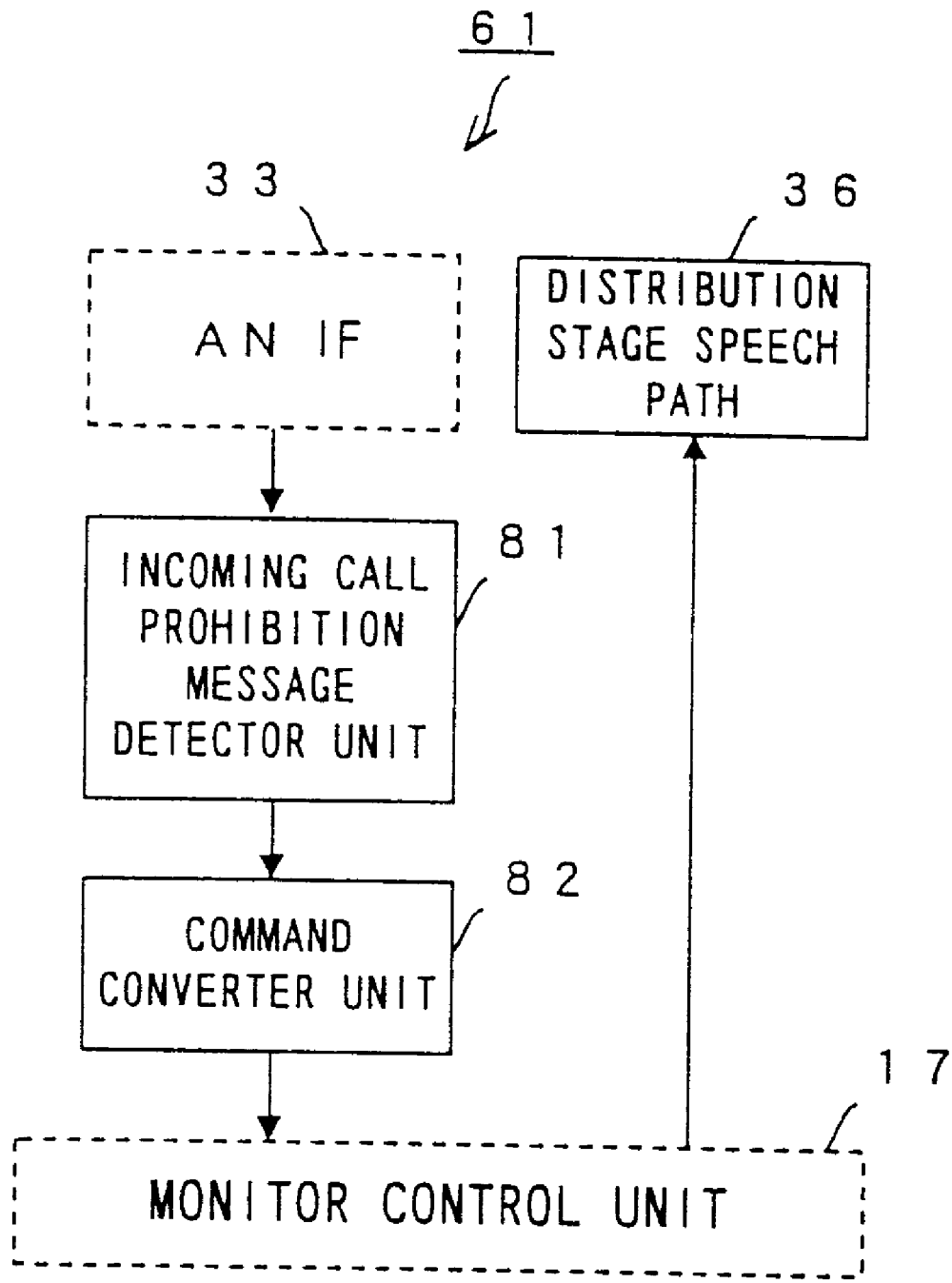
F I G. 14

2.048kb/s Frame:
Timeslot 0 - 31
Frame #0 - #15

0 | 0 | 1~15 | 16 | 17~31 |

15 | 0 | | | |

F I G. 1 5 A

Timeslot 0 of Frame #0 to #15:

| Frame Number | Bits 1 to 8 of the frame | | | | | | | |
|---|---|---|---|---|---|---|---|---|
| | 1 | 2 | 3 | 4 | 5 | 6 | 7 | 8 |
| #0 | C1 | 0 | 0 | 1 | 1 | 0 | 1 | 1 |
| #1 | 0 | 1 | A | S4 | S5 | S6 | S7 | S8 |
| #2 | C2 | 0 | 0 | 1 | 1 | 0 | 1 | 1 |
| #3 | 0 | 1 | A | S4 | S5 | S6 | S7 | S8 |
| #4 | C3 | 0 | 0 | 1 | 1 | 0 | 1 | 1 |
| #5 | 0 | 1 | A | S4 | S5 | S6 | S7 | S8 |
| #6 | C4 | 0 | 0 | 1 | 1 | 0 | 1 | 1 |
| #7 | 0 | 1 | A | S4 | S5 | S6 | S7 | S8 |
| #8 | C1 | 0 | 0 | 1 | 1 | 0 | 1 | 1 |
| #9 | 1 | 1 | A | S4 | S5 | S6 | S7 | S8 |
| #10 | C2 | 0 | 0 | 1 | 1 | 0 | 1 | 1 |
| #11 | 1 | 1 | A | S4 | S5 | S6 | S7 | S8 |
| #12 | C3 | 0 | 0 | 1 | 1 | 0 | 1 | 1 |
| #13 | Si | 1 | A | S4 | S5 | S6 | S7 | S8 |
| #14 | C4 | 0 | 0 | 1 | 1 | 0 | 1 | 1 |
| #15 | Si | 1 | A | S4 | S5 | S6 | S7 | S8 |

F I G. 1 5 B

SUBSCRIBER LINE TEST SYSTEM FOR ACCESS NETWORK

BACKGROUND OF THE INVENTION

1. Field of the Invention

The present invention relates to a line test system for testing an access network (AN) through access nodes.

2. Description of the Related Art

Lately, both the digitization of subscriber lines and the use of fiber-optic cables in transmission lines have been promoted, and an access node has been introduced into an access network. Conventionally, in subscriber lines, wires from an exchange were directly connected to the telephone sets or terminal sets of subscribers. In such a conventional configuration, an area which can be covered by one exchange was limited since the transmission rate is often restricted and the length of the wire is also often restricted due to the degradation of signals. However, since by introducing a transmission system which is configured using digital lines, fiber-optics, etc. into a subscriber line, the transmission rate of a subscriber line can be increased and the degradation of signals can be suppressed, the length of a subscriber line can be extended and an area which is covered by one exchange can be extended. By increasing the capacity of an exchange, the number of exchanges can also be reduced.

FIG. 1 shows the basic configuration of an access network.

The access network comprises a subscriber set 1300, such as a telephone set, etc., a subscriber line 1301, an access node 1302 and a local exchange (LE) 1303. The access node 1302 includes a remote terminal (RT) 1304, a central terminal (CT) 1306 and a transmission line 1305 which connects the remote terminal 1304 and the central terminal 1306. RT1304 and RT1306 do not necessarily need to be connected in a one to one fashion; multiple RT1304 units can be connected to one RT1306. If RT1304 is provided with an interface through an exchange, CT1306 is not required, and a transmission line 1305 is sometimes directly connected to LE1303.

For the interface between the access node 1302 and LE1303, a standard interface which is set forth generally in ITU-T G. 965 or ETS300 347 is used, and is called a V5.2 interface.

In order to secure the reliability of accommodated subscriber lines, the conventional LE1303 is provided with a means for carrying out both a subscriber line test and a speech path test as line tests for an access network at regular or arbitrary intervals of time. If the access node 1302 is introduced into an access network, the target section of a speech path test between RT and LE is expanded and the importance of the test increases. The subscriber line test is an analog measurement by which the resistance of one pair of conductors, etc., is measured. In view of the nature of such tests, both a subscriber line test unit (SLT) 1304a and a speech path test unit (SPT) 1304b are mounted on RT1304. In this case too, test facilities similar to those of the subscriber line which is directly accommodated in LE1303 must be provided.

FIG. 2 shows the system configuration of a conventional access network.

Telephone sets 1400 shown in the upper part of FIG. 2 are directly accommodated in LE1402. But, telephone sets 1401 shown in the lower part of FIG. 2 are accommodated in LE1402 through AN1403. Even if during maintenance on RT1404, an attempt is made to carry out the speech path test of a certain line using a local craft terminal (LCT) 1405, in the conventional system, a third party could call up on a line to be tested during the test, and the speech path test would sometimes be disturbed.

Maintenance personnel designate a line to be tested by using LCT1405, and instructs SPT1406 to start the speech path test. SPT1406 originates a call to a call back test unit (CST) 1407 and confirms the procedures of processes up to the establishment of a line. When the line is established, maintenance personnel carry out a voice test, and confirms the quality of the line. Then, maintenance personnel confirm the procedure of the call clearing process. When the line is established, CBT1407 records the telephone number of a calling party. A certain time period after SPT1406 call clearing, CBT1407 originates and returns a call to SPT1406, and SPT1406 detects a ringing signal and confirms the procedure of a call termination process. After the establishment of the line, CBT1407 clears the call, and confirms the procedure of the process.

However, if from the time when SPT1406 completes the clearing process until the time when CBT1407 originates a call, a third party originates a call, the call arrives at SPT1406, which disturbs both the maintenance personnel engaged in the speech path test and the calling party (third party).

FIG. 3 shows the configuration of SPT1406.

A speech path test control unit 1504 controls the entire test procedure of the speech path test. The speech path test control unit 1504 receives calls originated from telephone sets 1401, etc., and controls a relay in order to execute processes, such as establishing a telephone line, etc. In order to carry out tests, the speech path test control unit 1504 includes a speech path test measurement unit 1500, a relay control unit 1501, a multi-frequency (MF) oscillator 1503, and a call control unit 1502. In a speech path test, first, an instruction to originate a call is issued from the speech path test control unit 1504 to the call control unit 1502. The relay control unit 1501 which receives the instruction from the call control unit 1502 closes a relay 1506 and acts on LE1402 so that the effect is the same as when the handset of the telephone set is lifted. Then, a dial tone is returned from LE1402, and it is confirmed by the speech path test measurement unit 1500 that a telephone number is ready to be inputted any time. Then, a call is originated to CBT1407 on the LE1402 side. At this point, either pulse dialing or tone dialing is selected. If pulse dialing is selected, the call control unit 1502 transmits a telephone number by turning the relay 1506 on/off under the control of the relay control unit 1501. If tone dialing is selected, the call control unit 1502 causes the MF oscillator 1503 to transmit the telephone number in an audio format.

As described above, in the conventional system, in a state where a line to be tested is temporarily returned to a normal (idle) condition after SPT1406 call clearing during the speech path test, SPT1406 cannot refuse to receive an incoming call from a third party, which disturbs both the calling party and SPT1406 and causes a problem in that an exact speech path test result cannot be obtained.

In the subscriber line test and speech path test of a subscriber who is directly accommodated in LE1402, LE1402 can operate its own incoming call control function, since those tests are carried out by LE1402. By using this incoming call control function, the subscriber line test of a subscriber who is directly accommodated in LE1402 can be smoothly carried out. Thus, in the case of the subscriber line test of a subscriber who is directly accommodated in LE1402, the test can be carried out in such a way that the test may not be disturbed by a third party.

Since an access network through a V5.2 interface has recently been introduced, the test can be carried out in the remote terminal of an access network which is installed remotely and not in an exchange (LE). As a rule and even in this case, the incoming call control function of the exchange should be operated during the test.

In particular, the introduction of an access network plays an important role in a speech path test. Since a speech path which is conventionally confined inside an exchange is extended to a remote terminal which is located remotely, it will suffer from a greater failure rate.

SUMMARY OF THE INVENTION

The object of the present invention is to provide a function to execute the incoming call prohibition of an exchange from a remote terminal from the start until the end of the speech path test of a line to be tested, in the speech path test of a section between an access network and the exchange.

A system in the first aspect of the present invention comprises an incoming call prohibition control unit including a means for monitoring the progress of a speech path test and controlling the generation of an incoming call prohibition signal and an incoming call prohibition cancellation signal, a means for inserting the ID of a line to be tested in the incoming call prohibition signal and incoming call prohibition cancellation signal, a means for generating a control message of a common channel signalling system using the incoming call prohibition signal and incoming call prohibition cancellation signal, and an incoming call prohibition signal detector unit including a means for detecting an incoming call prohibition message and an incoming call prohibition cancellation message in which the ID of the line to be tested is set, a means for converting the incoming call prohibition message and the incoming call prohibition cancellation message to the incoming call prohibition command and the incoming call prohibition cancellation command, respectively, of an exchange and a means for inputting the incoming call prohibition command and the incoming call prohibition cancellation command to the monitor control unit of the exchange. By transmitting and receiving the incoming call prohibition signal and incoming call prohibition cancellation signal in which messages of a common channel signalling system are used for communication between the incoming call prohibition control unit and incoming call prohibition signal detector unit, the exchange can be controlled.

A system in the second aspect of the present invention comprises an incoming call prohibition control unit including a means for monitoring the progress of a speech path test and controlling the generation of an incoming call prohibition signal and an incoming call prohibition cancellation signal, a means for generating codes for MF signals using the incoming call prohibition signal and incoming call prohibition cancellation signal and an MF oscillator for converting the codes to MF signals and transmitting them, an incoming call prohibition signal detector unit including a means for detecting the MF signals for both incoming call prohibition and incoming call prohibition cancellation, a means for converting the MF signal for incoming call prohibition and the MF signal for incoming call prohibition cancellation to the incoming call prohibition command and the incoming call prohibition cancellation command, respectively, of an exchange and a means for inputting both the incoming call prohibition command and the incoming call prohibition cancellation command to the monitor control unit of the exchange, and a communications means for transmitting the MF signals for both incoming call prohibition and incoming call prohibition cancellation which are transmitted from the incoming call prohibition control unit, to the incoming call prohibition signal detector unit. By transmitting and receiving the incoming call prohibition signal and incoming call prohibition cancellation signal in which MF signals are used between the incoming call prohibition control unit and incoming call prohibition signal detector unit, the exchange can be controlled.

A system in the third aspect of the present invention comprises an incoming call prohibition control unit including a means for monitoring the progress of a speech path test and controlling the generation of an incoming call prohibition signal and an incoming call prohibition cancellation signal, a means for binary-coding the ID of a line to be tested in order to insert in three bits Sa4, Sa5 and Sa6 of an E1 frame and inserting them in both the incoming call prohibition signal and incoming call prohibition cancellation signal, a means for binary-coding both the incoming call prohibition signal and incoming call prohibition cancellation signal and generating signals to be inserted in a bit Sa8 of an E1 frame and a means for transmitting the incoming call prohibition signal, incoming call prohibition cancellation signal and the ID of the line to be tested, and an incoming call prohibition signal detector unit including a means for detecting both an incoming call prohibition message and an incoming call prohibition cancellation message, a means for converting both the incoming call prohibition message and incoming call prohibition cancellation message to the incoming call prohibition command and the incoming call prohibition cancellation command, respectively, of an exchange and a means for inputting both the incoming call prohibition command and incoming call prohibition cancellation command to the monitor control unit of the exchange. By transmitting and receiving the incoming call prohibition signal and incoming call prohibition cancellation signal in which E1 frame bits are used between the incoming call prohibition control unit and incoming call prohibition signal detector unit, the exchange can be controlled.

A system in the fourth aspect of the present invention is an apparatus for carrying out a speech path test through an access network which is installed between a subscriber set and an exchange, and comprises an incoming call prohibition control unit for transmitting an incoming call prohibition instruction or incoming call prohibition cancellation instruction to the exchange, an incoming call prohibition signal detector unit for receiving the incoming call prohibition instruction or incoming call prohibition cancellation instruction from the incoming call prohibition control unit, and a monitor control unit for instructing the distribution stage speech path of the exchange to exercise an incoming call prohibition or incoming call prohibition cancellation based on the incoming call prohibition instruction or incoming call prohibition cancellation instruction which is received by the incoming call prohibition signal detector unit.

According to the present invention, when a speech path test between RT and LE is carried out in an access network which has been recently introduced, incoming call prohibition can be exercised on the RT side in such a way that no call arrives from a third party at a line to be tested during the test, and when the test is finished, the incoming call prohibition can be cancelled.

BRIEF DESCRIPTION OF THE DRAWINGS

FIG. 7 shows an configuration example of an incoming call prohibition signal detector unit in the first preferred embodiment.

FIGS. 8A and 8B explain the data structure of the control protocol message of the 16th time slot in a common channel signalling system.

FIG. 11 shows a configuration example of an incoming call prohibition signal detector unit in the second preferred embodiment.

FIG. 12 shows the configuration of an incoming call prohibition system using E1 frame bits, which is the third preferred embodiment of the present invention.

FIG. 14 shows a configuration example of an incoming call prohibition signal detector unit in the third preferred embodiment.

FIGS. 15A and 15B show the insertion position in E1 frame bits of an incoming call prohibition signal.

DESCRIPTION OF THE PREFERRED EMBODIMENTS

Figure 4:
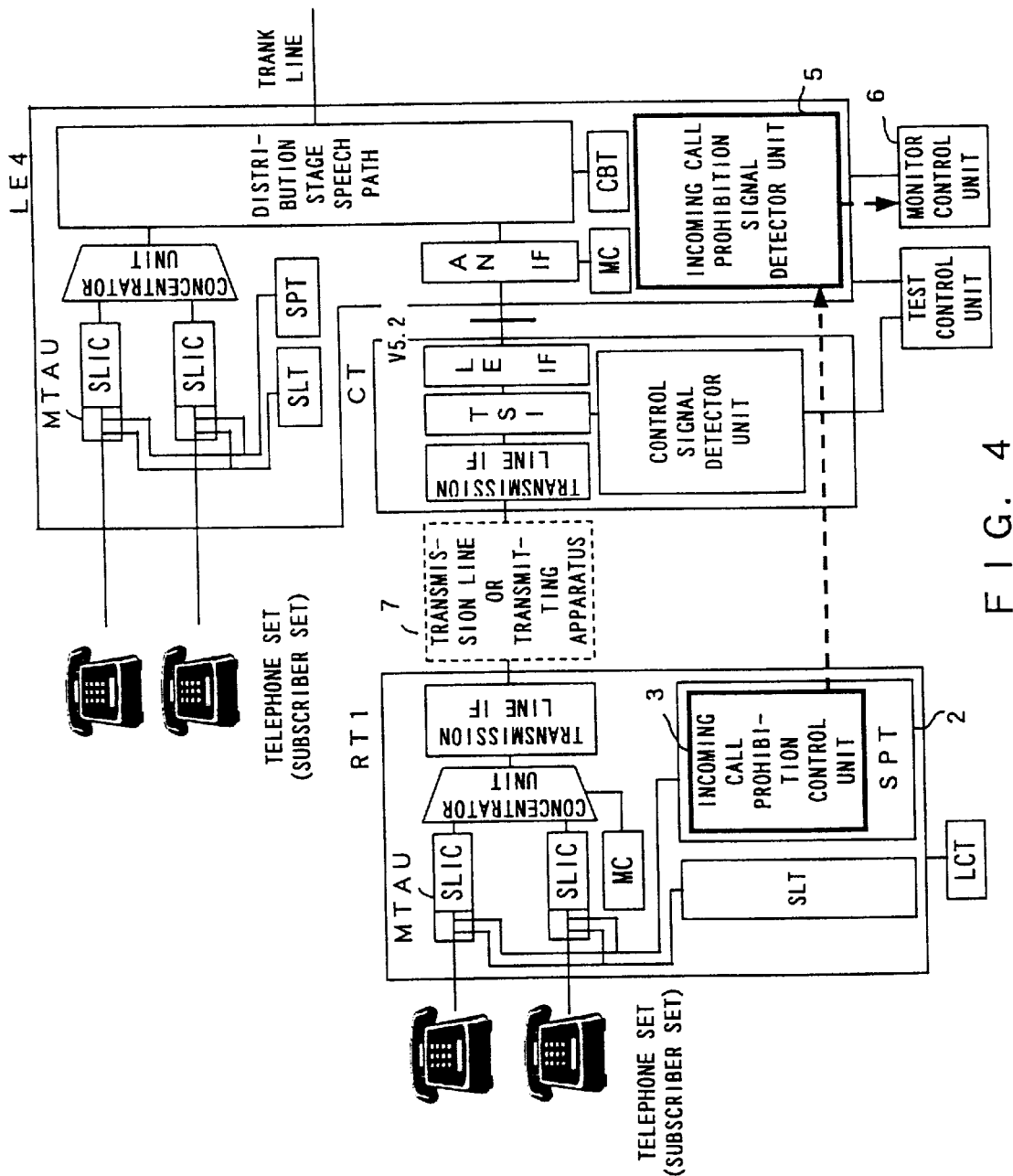
FIG. 4 explains the principle of a preferred embodiment of the present invention.

FIG. 4 explains the principle of a preferred embodiment of the present invention.

An incoming call prohibition control unit 3 for controlling and transmitting an incoming call prohibition signal is provided in the SPT2 of RT1. An incoming call prohibition signal detector unit 5 for detecting the incoming call prohibition signal and inputting an incoming call prohibition command to the monitor control unit 6 of LE4 is provided in LE4. A communications means for performing communications between the incoming call prohibition control unit 3 and the incoming call prohibition signal detector unit (RT and LE) is provided.

(1) In the first preferred embodiment of the present invention, the incoming call prohibition control unit 3 includes a means for monitoring the progress of a speech path test and controlling the generation of an incoming call prohibition signal and an incoming call prohibition cancellation signal, a means for inserting the ID of a line to be tested in both the incoming call prohibition signal and incoming call prohibition cancellation signal, a means for generating a control message of a common channel signalling system using both the incoming call prohibition signal and incoming call prohibition cancellation signal. The incoming call prohibition control unit 3 transmits both an incoming call prohibition message and an incoming call prohibition cancellation message to the incoming call prohibition signal detector unit 5 through the above-described communications means. The incoming call prohibition signal detector unit 5 includes a means for detecting both the incoming call prohibition message and incoming call prohibition cancellation message, a means for converting the incoming call prohibition message and the incoming call prohibition cancellation message to the incoming call prohibition command and the incoming call prohibition cancellation command, respectively, of LE4 and a means for inputting both the incoming call prohibition command and incoming call prohibition cancellation command to the monitor control unit 6 of LE4.

(2) In the second preferred embodiment of the present invention, the incoming call prohibition control unit 3 includes a means for monitoring the progress of a speech path test and controlling the generation of an incoming call prohibition signal and an incoming call prohibition cancellation signal, a means for generating numerical codes for MF signals using the incoming call prohibition signal and incoming call prohibition cancellation signal and an MF oscillator for converting the codes to MF signals and transmitting them. The incoming call prohibition signal detector unit 5 includes a means for detecting the MF signals for both incoming call prohibition and incoming call prohibition cancellation which are transmitted from the MF oscillator, a means for converting the MF signal for incoming call prohibition and MF signal for incoming call prohibition cancellation to the incoming call prohibition command and the incoming call prohibition cancellation command, respectively, of LE4 and a means for inputting both the incoming call prohibition command and the incoming call prohibition cancellation command to the monitor control unit 6 of LE4.

(3) In the third preferred embodiment of the present invention, the incoming call prohibition control unit 3 includes a means for monitoring the progress of a speech path test and controlling the generation of an incoming call prohibition signal and an incoming call prohibition cancellation signal, a means for binary-coding the ID of a line to be tested in order to insert in three bits Sa4, Sa5 and Sa6 of an E1 frame and inserting them in both the incoming call prohibition signal and incoming call prohibition cancellation signal, a means for binary-coding both the incoming call prohibition signal and incoming call prohibition cancellation signal and generating signals to be inserted in a bit Sa8 of an E1 frame and a means for transmitting both the incoming call prohibition signal and incoming call prohibition cancellation signal. The incoming call prohibition control unit 3 transmits both an incoming call prohibition message and an incoming call prohibition cancellation message to the incoming call prohibition signal detector unit 5. The incoming call prohibition signal detector unit 5 includes a means for detecting both the incoming call prohibition message and incoming call prohibition cancellation message, a means for converting both the incoming call prohibition message and incoming call prohibition cancellation message to the incoming call prohibition command and the incoming call prohibition cancellation command, respectively, of LE4 and a means for inputting both the incoming call prohibition command and incoming call prohibition cancellation command to the monitor control unit 6 of LE4.

In each of the above-described preferred embodiments of the present invention, both the incoming call prohibition and incoming call prohibition cancellation of a line to be tested can be exercised in RT1 by using signals for incoming call prohibition and incoming call prohibition cancellation, and thereby an incoming call from a third party can be prevented from arriving at the line to be tested during the speech path test. In the above-described configuration, the signals for both incoming call prohibition and incoming call prohibition cancellation are transmitted through a transmission line 7, and the incoming call prohibition and incoming call prohibition cancellation are exercised in LE4.

The incoming call prohibition system corresponding to the first preferred embodiment described in (1) above in which a common channel signalling system is used, is described below with reference to FIGS. 5 through 8.

Figure 5:
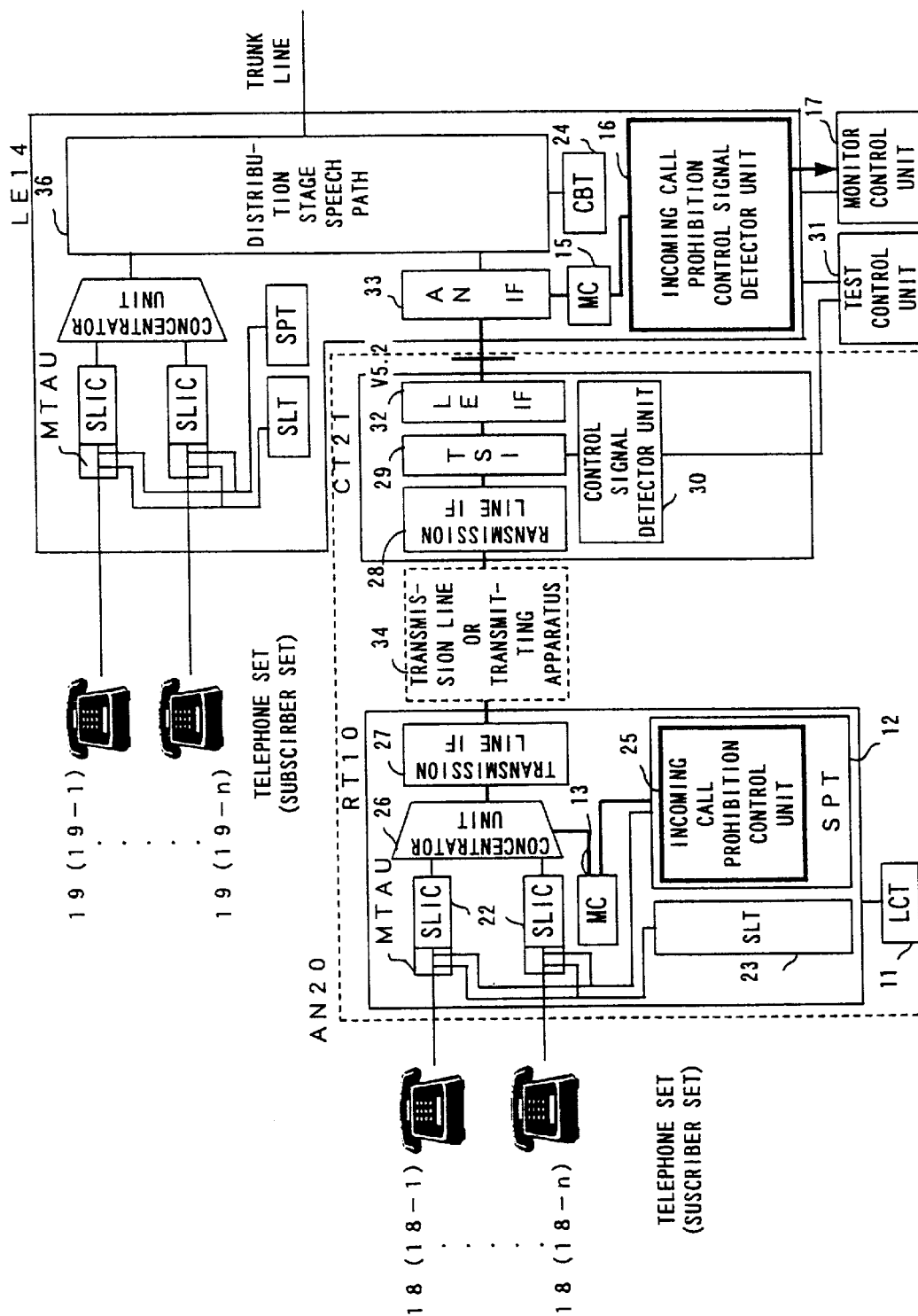
FIG. 5 shows the configuration of an incoming call prohibition system using a common channel signalling system which is the first embodiment of the resent invention, and in particular the configuration of a system connecting AN and LE using a V5.2 interface, which is a standard interface.

FIG. 5 shows the configuration of an incoming call prohibition system using a common channel signalling system, and in particular the configuration of a system connecting AN and LE using a V5.2 interface, which is a standard interface.

Maintenance personnel attending to RT10 start a speech path test between RT and LE of an arbitrary line using LCT11. If both a designation on a line to be tested and a start instruction on the speech path test are transmitted from LCT11 to SPT12, the speech path test control unit in the incoming call prohibition control unit 25 of SPT12 writes the ID of a line to be tested (for example, a layer (L)3 address in a V5.2 interface) in a register, and transmits the ID of the line to be tested to a message controller (MC) 13 together with an incoming call prohibition command (for example, a bit string of "0011001" which is set in the corresponding insertion position of a control protocol message in the V5.2 interface). MC13 transmits the incoming call prohibition message to MC15 on the LE14 side as one of the messages of a common channel signalling system.

MC15 on the LE14 side receives the control signal having passed through a control path which is set forth in the standards. An incoming call prohibition signal detector unit 16 detects and extracts the incoming call prohibition message from it, and converts the incoming call prohibition message to an incoming call prohibition command for the monitor control unit 17 of LE14 (for example, "SPS TER, N: xxx-xxxx", provided, however, that "xxx-xxxx" indicates the subscriber number of a line to be tested). When this incoming call prohibition command is inputted to the monitor control unit 17 of LE4, LE14 exercises incoming call prohibition over the line to be tested, an incoming call from a third party to the line to be tested is prevented from arriving at the line to be tested in LE14, and any influence it may have on the speech path test between RT and LE is prevented.

The same applies to an incoming call prohibition cancellation signal. After CBT 24 originates and returns a call to SPT12 and a line is established between CBT and SPT, the incoming call prohibition control unit 25 of SPT12 transmits an incoming call prohibition cancellation message to MC15 on the LE14 side as a messages of a common channel signalling system using a message in which "0011010" is set in the insertion position of the control protocol message in the V5.2 interface as an incoming call prohibition cancellation signal. On the LE14 side, the incoming call prohibition cancellation message is converted to an incoming call prohibition cancellation command (for example, "SPR N: xxx-xxxx") by MC15. When this incoming call prohibition cancellation command is inputted to the monitor control unit 17 of LE14, LE14 cancels the incoming call prohibition over the line to be tested, and the subscriber line returns to a normal condition.

In FIG. 5, since telephone sets 19 (19-1 through 19-n) are directly connected to LE14, their speech path tests are carried out in a conventional way. Since telephone sets 18 (18-1 through 18-n) are connected to LE14 through an AN20, this preferred embodiment is applied to their speech path tests. AN20 includes RT10, CT21 and a transmission line 34 (or transmitting apparatus) which connects RT10 and CT21. The telephone sets 18 are accommodated in the SLIC22 of RT10. When an ordinary call is placed, SLIC22 detects both incoming and originated calls, and connects them to LE14 through both the transmission line (transmitting apparatus) 34 and CT21.

SLIC22 connects SPT12 and SLT23, and carries out both a subscriber line test and a speech path test. SPT12 carries out tests through LCT11 based on commands which are inputted by maintenance personnel, as with a telephone simulator. For example, after an operation of lifting a handset is simulated and a line is established, the telephone number of CBT24 in LE14 is dialed and information about the receiving condition in CBT24 is received by SLT23. By displaying and analyzing this information on a monitor, etc., which is provided in LCT11, the condition of the speech path between RT and LE can be checked.

Here, if an attempt is made to test a line to which one of the telephone sets 18 is connected, for example, and if a call is originated from a telephone set 19-1 to a telephone set 18-i which is connected to a line which is currently tested, out of the telephone sets 18, incoming call prohibition has to be exercised over LE14 in such a way that the call from the telephone set 19-1 may not be transmitted to the line which is currently being tested. For this reason, the SPT12 of RT10 is provided with an incoming call prohibition control unit 25, and the system is configured in such a way that an instruction to exercise an incoming call prohibition can be transmitted as a control message of a common channel signalling system. The control message is generated as a message of a common channel signalling system by MC13 using a command which is outputted from SPT12, is embedded in a part of the signal format of a V5.2 interface which is the standard interface of AN20, by a concentrator unit 26 and is transmitted. One unit of the signal format of the V5.2 interface consists of 32 time slots, time slots #0 through #31. In the common channel signalling system, information on the telephone line of which central office number a call is originated, is inserted in #16 time slot out of the 32 time slots, and is transmitted. In this preferred embodiment, an incoming call prohibition command or incoming call prohibition cancellation command is set in the empty field of the 16th time slot, and is transmitted from a transmission line interface 27 to LE14 through a transmission line 34.

CT21 inputs the signals which are received from RT10 to a time slot interchange (TSI) 29 through a transmission line interface 28. TSI29 interchanges the time slots, extracts a control signal which is needed for a speech path test by a control signal detector unit 30, and transmits the control signal to a test control unit 31. The remaining signals which have passed through TSI29 are transmitted to the AN interface 33 of LE14 through an LE interface 32. MC15 extracts the frame information of the V5.2 interface from the signals which are inputted from the AN interface 33, and transmits the frame information to an incoming call prohibition signal detector unit 16. The incoming call prohibition signal detector unit 16 detects both an incoming call prohibition message and an incoming call prohibition cancellation message, and extracts them from the frame information. The extracted incoming call prohibition message or incoming call prohibition cancellation message is converted to a corresponding command, and is transmitted to the monitor control unit 17 which is used by maintenance personnel to control LE14. When the command is inputted to the monitor control unit 17, a control signal for exercising incoming call prohibition or incoming call prohibition cancellation over the line which is currently tested, is transmitted to the distribution stage speech path 36 of LE14 in the same way as commands which are inputted by maintenance personnel. According to such a configuration, even if maintenance personnel carrying out a speech path test, attend to the RT10 side which is connected to LE14 through both LE14 and AN20 and is located remotely from LE14, the maintenance personnel can successfully exercise both the incoming call prohibition and incoming call prohibition cancellation over the tested line by remotely controlling LE14.

Figure 6:
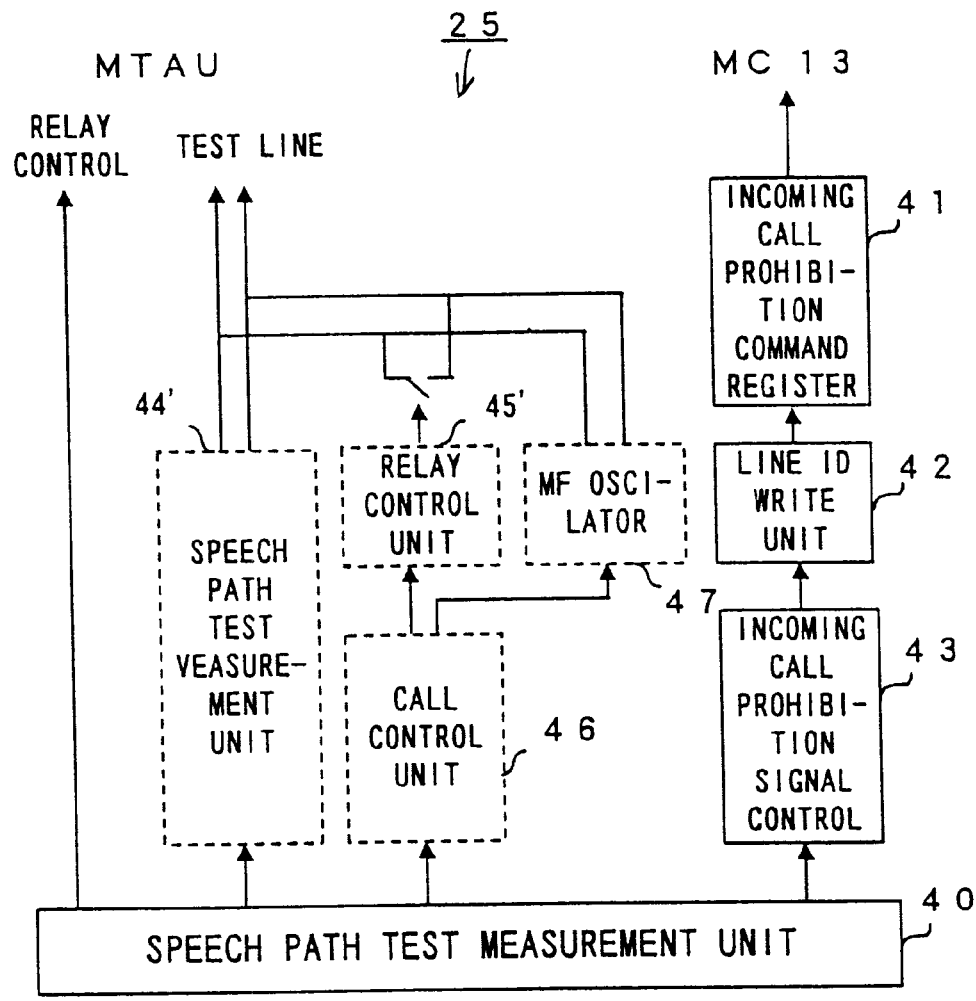
FIG. 6 shows a configuration example of an incoming call prohibition control unit in the first preferred embodiment.

FIG. 6 shows a configuration example of an incoming call prohibition control unit 25 in the first preferred embodiment.

The incoming call prohibition control unit 25 in this preferred embodiment includes a component for generating commands to be transmitted to MC13, in addition to the conventional components. Both a designation on a line to be tested and a start instruction on a speech path test are transmitted from LCT11 to SPT12. A speech path test control unit 40 instructs an incoming call prohibition signal control unit 43 to generate an incoming call prohibition command. The incoming call prohibition signal control unit 43 executes the generation process of the incoming call prohibition command, and outputs it to a line ID write unit 42. Simultaneously, the incoming call prohibition signal control unit 43 instructs the line ID write unit 42 to write in the incoming call prohibition command the ID of a line to be tested of which incoming call prohibition is designated to be exercised. The incoming call prohibition command in which the ID of the line to be tested is written by the line ID write unit 42, is transmitted from the line ID write unit 42 to an incoming call prohibition command register 41, is stored there and is transmitted to MC13. In the same way, an incoming call prohibition cancellation command to which the ID of a line to be tested is attached, is transmitted to the incoming call prohibition signal control unit 43, the line ID write unit 42 and MC13 through the incoming call prohibition command register 41.

Figure 1:
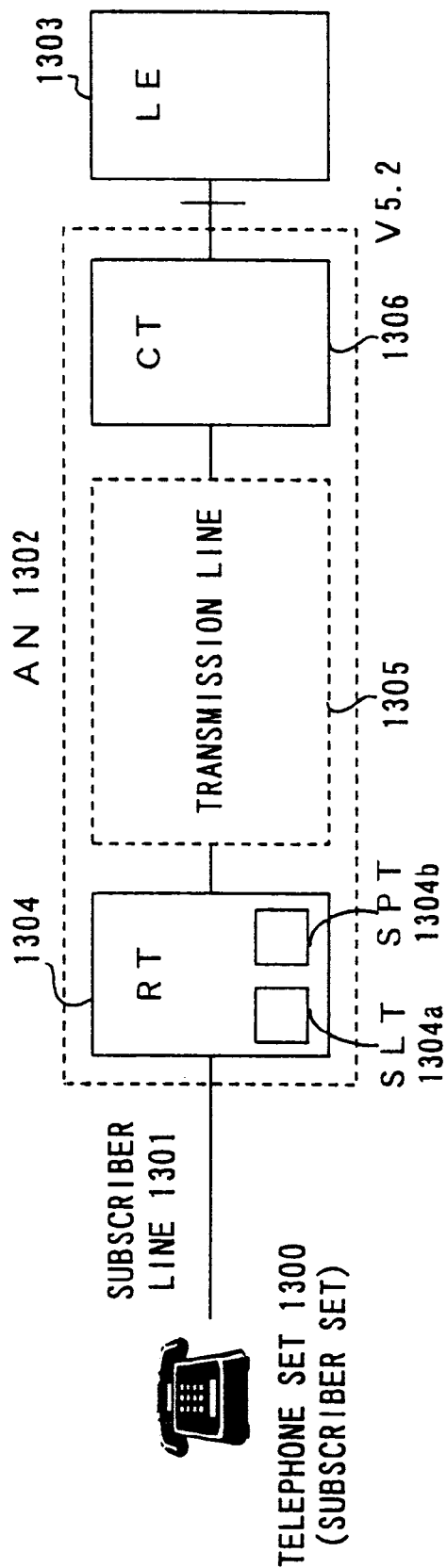
FIG. 1 shows the basic configuration of an access network.
Figure 2:
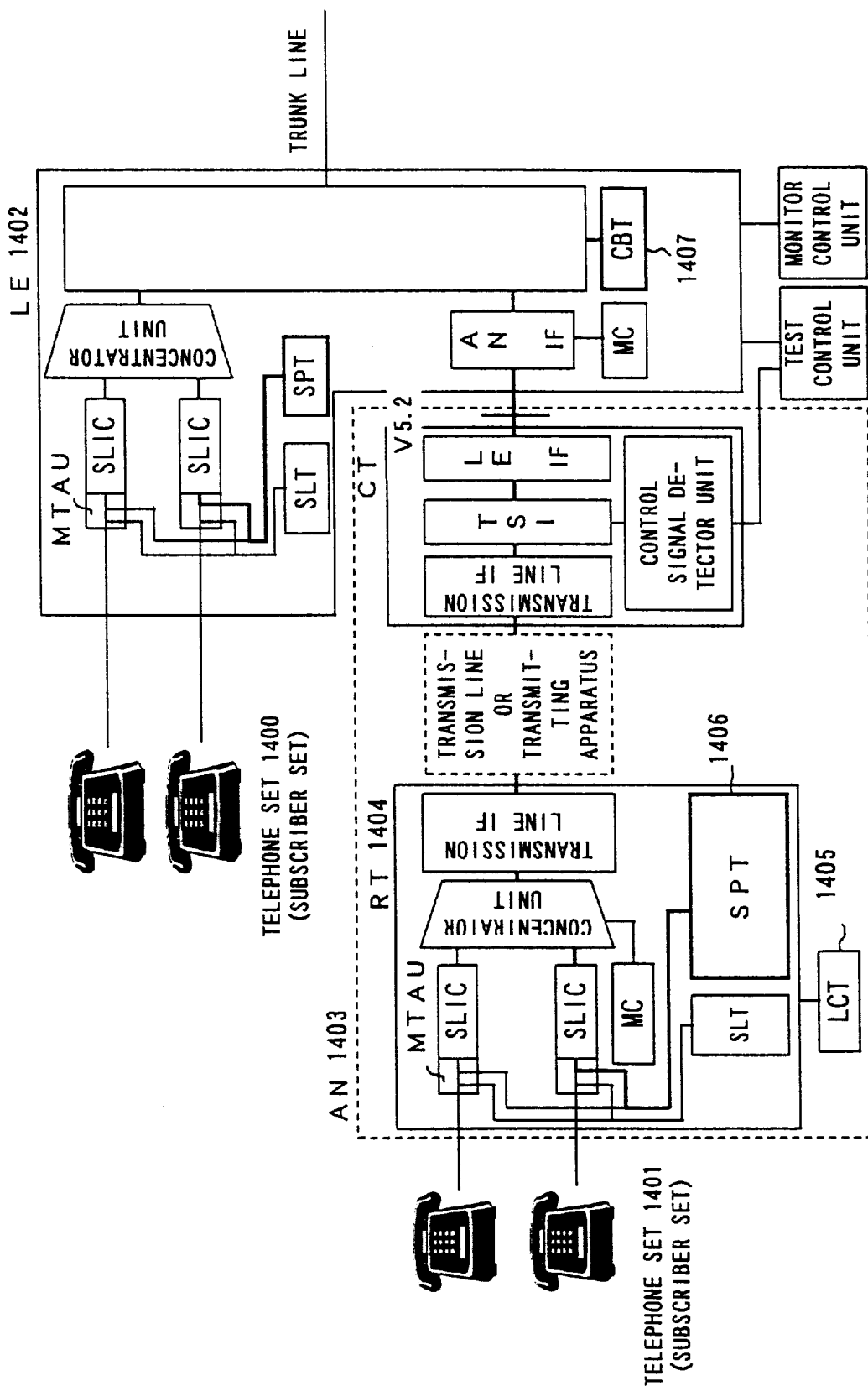
FIG. 2 shows the system configuration of a conventional access network.
Figure 3:
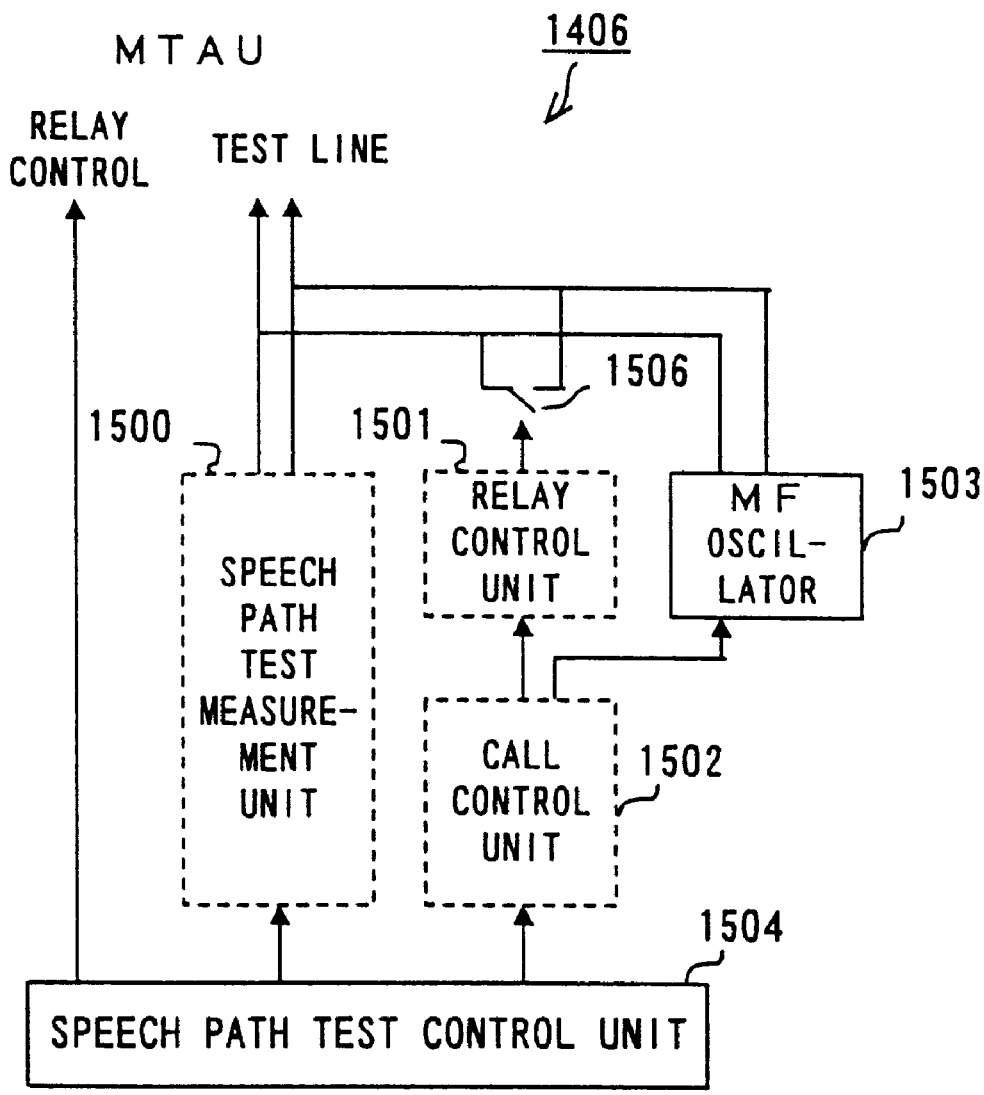
FIG. 3 shows the configuration of a conventional speech path test unit.

Other components 44' through 47 correspond to the components with the same description as described with reference to FIG. 3.

FIG. 7 shows an configuration example of an incoming call prohibition signal detector unit 16 in the first preferred embodiment.

The incoming call prohibition signal detector unit 16 includes an incoming call prohibition message detector unit 44 and a command converter unit 45. When receiving a message from MC15, the incoming call prohibition message detector unit 44 analyzes the message which is transmitted from MC15, detects an incoming call prohibition message there, and extracts it from there. The incoming call prohibition message which is extracted from the incoming call prohibition message detector unit 44 is transmitted to the command converter unit 45. The command converter unit 45 converts the incoming call prohibition message to an incoming call prohibition command which can be executed by the processor of a monitor control unit 17 in LE14, the result of which is transmitted to the monitor control unit 17. The monitor control unit 17 is provided for maintenance personnel to control the connection of lines of a distribution stage speech path 36 (the main body of the exchange) in LE14, which modifies the line connection of the distribution stage speech path 36 or exercises an incoming call prohibition over a designated line by commands inputted by maintenance personnel. If an incoming command is inputted from the command converter unit 45, the monitor control unit 17 transmits a control signal to the distribution stage speech path 36 with maintenance personnel inputting no command in such a way that incoming call prohibition can be exercised over a line which is designated by this command. The operation of an incoming call prohibition cancellation command is similar to that of the incoming call prohibition command.

FIGS. 8A and 8B explain the data structure of the control protocol message of a common channel signalling system of the #16 time slot.

For the communications of both an incoming call prohibition message and an incoming call prohibition cancellation message between MC13 on the RT10 side and MC15 on the LE14 side, an idle bit string in the control protocol message which flows in the #16 time slot 16 of a 2,048 Kb/s frame which is set forth in ITU-T G.703/704, is used. As shown in FIG. 8A, one frame consists of 32 time slots, #0 to #31, with frames #0 through #15 constituting a multi-frame. As shown in FIG. 8B, although a variety of protocol layers are set forth for the #16 time slot in ETS300 347, the unused message of a protocol function element is used for the #16 time slot. For example, for incoming call prohibition, "0011001" is assumed to be defined, and for incoming call prohibition cancellation, "0011010" is assumed to be defined. For a message to be used for incoming call prohibition and incoming call prohibition cancellation, an arbitrary bit string between "0011001" and "1111111" can be used.

The preferred embodiment of an incoming call prohibition system using MF signals is described below with reference to FIGS. 9 through 11.

Figure 9:
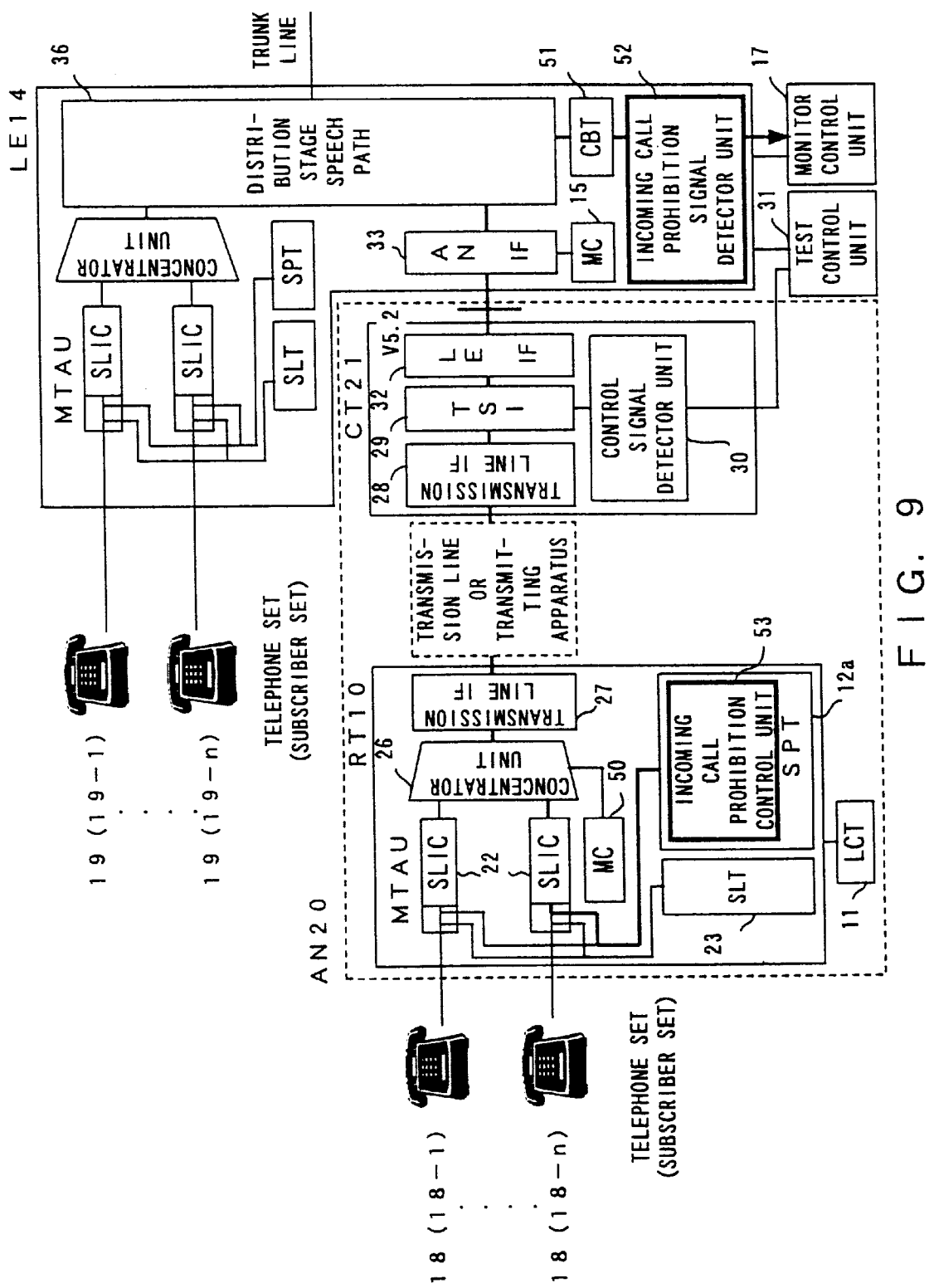
FIG. 9 shows the configuration of an incoming call prohibition system using MF signals, which is the second preferred embodiment of the present invention.

FIG. 9 shows the configuration of an incoming call prohibition system using MF signals, which is the second preferred embodiment of the present invention.

In FIG. 9 the same reference numbers are attached to the same components shown in FIG. 5.

Maintenance personnel start a speech path test between RT and LE of an arbitrary line using LCT11. If both a designation on a line to be tested and a start instruction on a speech path test are transmitted from LCT11 to SPT12, SPT12a originates a call to CBT51, and establishes a line up to CBT51. At this time, CBT51 records the subscriber number of the calling party. Immediately after, the speech path test control unit in SPT12a transmits an incoming call prohibition code (for example, "#112#") which is converted into an MF signal, to CBT51.

An incoming call prohibition signal detector unit 52 provided in LE14 detects this MF signal (incoming call prohibition signal), and extracts the subscriber number of the calling party which is recorded by CBT51. Then, the incoming call prohibition signal detector unit 52 converts it to an incoming call prohibition command for the monitor control unit 17 of LE14 (for example, "SPS TER, N: xxx-xxxx", provided, however, that "xxx-xxxx" indicates the subscriber number of a line to be tested), based on both the incoming call prohibition signal and the subscriber number information of a called party. When this command is inputted to the monitor control unit 17 of LE14, LE14 exercises incoming call prohibition over the line to be tested, an incoming call to the line to be tested from a third party is prohibited from arriving by LE14, thereby preventing influence on the speech path between RT and LE during the speech path test of the line to be tested.

The same applies to an incoming call prohibition cancellation signal. CBT51 originates and returns a call to SPT12a, and after a line is established between CBT and SPT, an incoming call prohibition cancellation code which is converted to an MF signal (for example, "#112*") is transmitted from SPT12a to CBT51.

The incoming call prohibition signal detector unit 52 of LE14 detects the incoming call prohibition cancellation signal and converts it to an incoming call prohibition cancellation command for the monitor control unit 17 of LE14 (for example, "SPR N: xxx-xxxx") using the subscriber number of the calling party which is recorded by CBT51. When this command is inputted to the monitor control unit 17 of LE14, LE14 cancels incoming call prohibition over the line to be tested, and the subscriber line returns to a normal condition.

If a speech path test is carried out, maintenance personnel designate a line to be tested and input a start instruction on the test from LCT11. Then, SPT12a originates a call to CBT51 through SLIC22 dialing the subscriber number of the line to be tested. CBT51 records the subscriber number. Then, SPT12a transmits an incoming call prohibition code from the incoming call prohibition control unit 53 to CBT 51 using tone signals which are oscillated by an MF oscillator. If the incoming call prohibition signal (incoming call prohibition code) which is overlaid on the tone signals is received, CBT51 transmits this signal to an incoming call prohibition signal detector unit 52. Then, The incoming call prohibition signal detector unit 52 judges over which line to exercise an incoming call prohibition from the subscriber number which is recorded in CBT51, and transmits the incoming call prohibition command to the monitor control unit 17. The monitor control unit 17 exercises incoming call prohibition over the distribution stage speech path 36, based on the received incoming call prohibition command. The monitor control unit 17 carries out a speech path test between RT and LE of the line to be tested, and when the test is completed, an incoming call prohibition cancellation signal (incoming call prohibition cancellation code) is transmitted from the incoming call prohibition control unit 53. When receiving the incoming call prohibition cancellation signal, the incoming call prohibition signal detector unit 52 passes incoming call prohibition cancellation command to the monitor control unit 17. When the incoming call prohibition cancellation command is inputted, the monitor control unit 17 issues an instruction to cancel incoming call prohibition over the line to be tested over which incoming call prohibition is exercised during the speech path test, to the distribution stage speech path 36.

Since the operations of other components are the same as those described earlier in the first preferred embodiment, descriptions of them are omitted.

Figure 10:
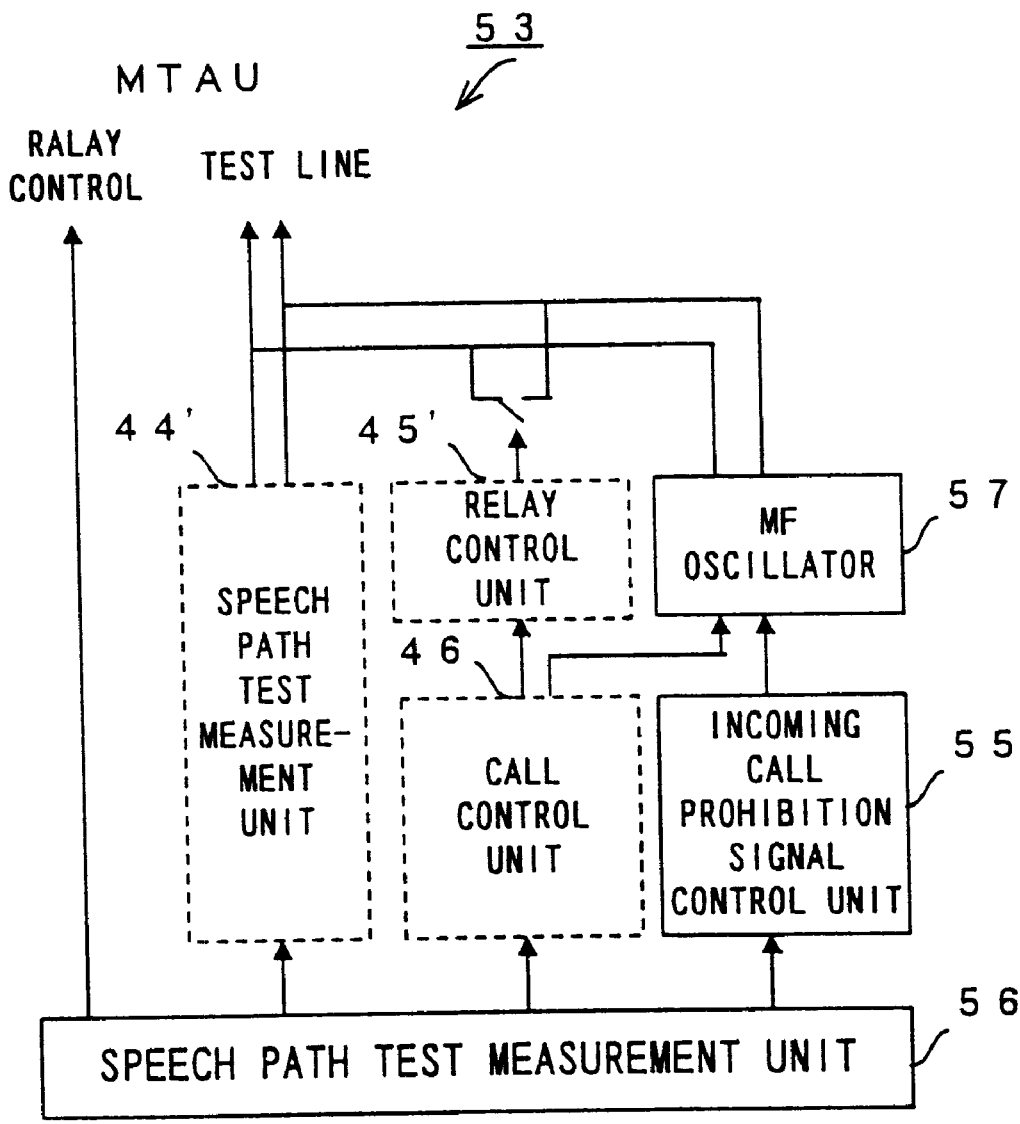
FIG. 10 shows a configuration example of an incoming call prohibition control unit in the second preferred embodiment.

FIG. 10 shows a configuration example of an incoming call prohibition control unit 53 in the second preferred embodiment.

The incoming call prohibition control unit 53 shown in FIG. 10 includes an MF oscillator 57 for transmitting tone signals and an incoming call prohibition signal control unit 55 in addition to the speech path test control unit 56, speech path test measurement unit 44', call control unit 46 and relay control unit 45' which are described earlier. As described earlier, when a speech path test is started, an instruction to originate a call is outputted from the speech path test control unit 56 to the relay control unit 451 through the call control unit 46, and if a dial tone is received by the speech path test measurement unit 44', dial pulses or tones are outputted from the relay control unit 45' or the MF oscillator 57, respectively. If a line is established, the incoming call prohibition signal control unit 55 which receives the instruction from the speech path test control unit 56, generates codes for instructing an incoming call prohibition to be exercised, and causes the MF oscillator 57 to transmit an incoming call prohibition signal corresponding to the code. If the speech path test is completed, the incoming call prohibition signal control unit 55 receives an instruction from the speech path test control unit 56 and causes the MF oscillator 57 to transmit an incoming call prohibition cancellation signal corresponding to an incoming call prohibition cancellation code.

FIG. 11 shows a configuration example of an incoming call prohibition signal detector unit 52 in the second preferred embodiment.

An incoming call prohibition signal which is transmitted from CBT51 in the form of an MF (tone) signal is detected by an incoming call prohibition signal detector unit 58, and a command converter unit 59 converts the incoming call prohibition signal to an incoming call prohibition command which can be read by the monitor control unit 17. When receiving the incoming call prohibition command, the monitor control unit 17 instructs the distribution stage speech path 36 to exercise incoming call prohibition over a line to be tested which is designated by the incoming call prohibition command. Then, if the speech path test of the line to be tested is completed, the incoming call prohibition signal detector unit 58 detects an incoming call prohibition cancellation signal which is transmitted from CBT 51, and the command converter unit 59 reads it. Then, the command converter unit 59 converts it to a corresponding incoming call prohibition cancellation code, and transmits it to the monitor control unit 17. When receiving this incoming call prohibition cancellation command, the monitor control unit 17 instructs the distribution stage speech path 36 to cancel incoming call prohibition over the line to be tested.

The preferred embodiment of an incoming call prohibition system using E1 frame bits, which is the third preferred embodiment of the present invention, is described below with reference to FIGS. 12 through 15B.

FIG. 12 shows the configuration of the incoming call prohibition system using E1 frame bits.

In FIG. 12 the same reference numbers are attached the same components shown in FIG. 5.

Maintenance personnel attending to RT10, starts a speech path test between RT and LE of an arbitrary line using LCT11. If both a designation on a line to be tested and a start instruction on a speech path test are issued, the speech test control unit in the incoming call prohibition signal control unit 60 of SPT12 writes the ID of the line to be tested (for example, a binary digit "001") in the line ID write unit, and transmits this ID to a transmission line interface (IF) 27 together with an incoming call prohibition command (for example, a binary digit "1") which is stored in an incoming command register. The transmission line IF 27 inserts the ID of the line to be tested in bits Sa4, Sa5 and Sa6 of an E1 frame which are set forth in ITU-T G.703, inserts the incoming call prohibition command in a bit Sa8 of an E1 frame which is set forth in ITU-T G.703, and transmits them to LE14.

An AN IF unit 33 on the LE14 side detects corresponding E1 frame bits. An incoming call prohibition signal detector unit 61 detects the incoming call prohibition command (E1 frame bit Sa8), and as a result, converts it to an incoming call prohibition command for the monitor control unit 17 of LE14 (for example, "SPS TER, N: xxx-xxxx, provided, however, that "xxx-xxxx" is the subscriber number of the line to be tested). If this command is inputted to the monitor control unit 17 of LE14, LE14 exercises incoming call prohibition over the line to be tested, incoming calls from a third party to the line to be tested are prohibited from arriving, thereby preventing influence on the speech path between RT and LE during the speech path test of the line to be tested.

The same applies to an incoming call prohibition cancellation signal. The speech path test control unit of the incoming call prohibition control unit 60 inserts an incoming call prohibition cancellation command (for example, a binary digit "0") in a bit Sa8 of an E1 frame, and transmits it to LE14. The incoming signal detector unit 61 in LE14 converts this command to another incoming call prohibition cancellation command (for example, "SPR N: xxx-xxxx"). If this command is inputted to the monitor control unit 17 of LE14, LE14 cancels incoming call prohibition over the line to be tested, and the subscriber line returns to a normal condition.

In the third preferred embodiment, the incoming call prohibition control unit 60 in SPT12b generates an incoming call prohibition command, and outputs this command to the transmission line IF 27. The transmission line IF 27 generates an E1 frame using signals which are inputted from a concentrator unit 26, which is transmitted to a transmission line (or transmitting apparatus) 34. Then, the incoming call prohibition command which is inputted from the incoming call prohibition control unit is inserted in the corresponding bit of this E1 frame, which is transmitted. This E1 frame is dissembled by the AN IF unit 33 of LE14, and a message to be communicated is extracted by MC15. However, the incoming call prohibition command which is contained in the E1 frame, is transmitted to the incoming call prohibition signal detector unit 61, is converted to the incoming call prohibition command for the monitor control unit 17, and is transmitted to the monitor control unit 17. The monitor control unit 17 analyzes the inputted incoming call prohibition command, and causes the distribution stage speech path 36 to exercise incoming call prohibition over the line to be tested.

The same applies to an incoming call prohibition cancellation command. An incoming call prohibition cancellation command is outputted from the incoming call prohibition control unit 60 of SPT12, is inserted in E1 frame bits by the transmission line IF 27, and is transmitted to LE14. The incoming call prohibition cancellation command which is transmitted in this way, is extracted by the AN IF unit 33, and is transmitted to the incoming signal detector unit 61. The incoming call prohibition cancellation command which is detected and is transmitted from the incoming call prohibition control unit 60, is converted to an incoming call prohibition cancellation command for the monitor control unit 17, and is transmitted to the monitor control unit 17. Under the control of the monitor control unit 17, incoming call prohibition over a line to be tested is cancelled by the distribution stage speech path 36.

In the first through third preferred embodiments, incoming call prohibition and incoming call prohibition cancellation commands for the monitor control unit 17 are not limited to commands based on characters. For example, if the monitor control unit 17 is configured using a terminal with a graphical user interface (GUI), commands which are provided by this GUI can also be used and executed.

Figure 13:
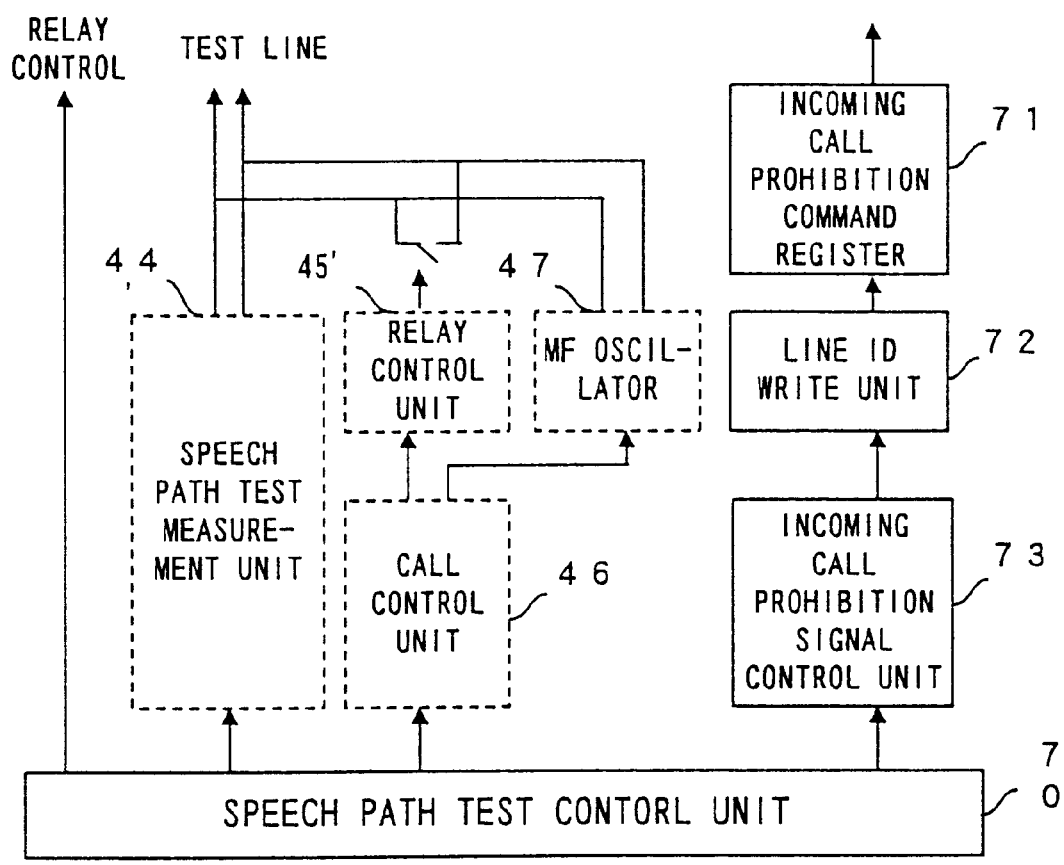
FIG. 13 shows a configuration example of an incoming call prohibition control unit in the third preferred embodiment.

FIG. 13 shows a configuration example of an incoming call prohibition control unit 60 in the third preferred embodiment.

In FIG. 13 the same reference numbers are attached to the same components shown in FIG. 6.

A speech path test control unit 70 issues an instruction to a call control unit 46. As a result, a relay control unit 45' closes a relay to make a line ready for connection. When a speech path test measurement unit receives a dial tone, the speech path test control unit 70 instructs the call control unit 46 to transmit the telephone number of a called party. The call control unit 46 controls the relay control unit or an MF oscillator 47 to transmit dial pulses or tones. The speech path test control unit 70 writes the ID of a line to be tested in a line ID write unit 72 through an incoming call prohibition signal control unit 73, and transmits the ID to an incoming call prohibition command register 71. Then, both the incoming call prohibition command which is stored in the incoming call prohibition command register 41 and the ID of the line to be tested which is written in the incoming call prohibition command register 41 by the line ID write unit 72 are transmitted to a transmission line IF 27. The transmission line IF 27 inserts both the ID of the line to be tested and the incoming call prohibition command in E1 frame bits, and transmits the E1 frame to LE14.

FIG. 14 shows a configuration example of an incoming call prohibition signal detector unit 61 in the third preferred embodiment.

The incoming call prohibition command or incoming call prohibition cancellation command in the received E1 frame is extracted by an AN IF unit 33, and is detected and extracted by an incoming call prohibition command detector unit 81. Then, the detected and extracted command is converted to an incoming call prohibition or incoming call prohibition cancellation command which can be read by the monitor control unit 17, by a command converter unit 82, and is outputted to the monitor control unit 17. Then, it is read by the monitor control unit 17. After reading it, the monitor control unit 17 controls the distribution stage speech path 36 to cause the LE14 to exercise incoming call prohibition or incoming call prohibition cancellation over the line to be tested. As described earlier, the monitor control unit 17 is a terminal for controlling the LE which is used, and usually controls the line connection, etc., of the distribution stage speech path 36 of LE14 when maintenance personnel input a command.

FIGS. 15A and 15B show the insertion position in E1 frame bits of an incoming call prohibition signal (the ID of a line to be tested and an incoming call prohibition or incoming call prohibition cancellation command). As shown in FIG. 15A, the E1 frame bits are contained in #0 time slot of a frame with the same format as described with reference to FIGS. 8A and 8B.

FIG. 15B shows the position of the Sa bits of an E1 frame. As shown in FIG. 15B, the two parts which are surrounded with bold square frames, of the #0 time slots of the #0 through #15 frames which compose a multi-frame, are the setting fields of bits Sa4, Sa5, Sa6 and Sa8. Here, because bit "S7" cannot be used for an incoming call prohibition signal or incoming call prohibition cancellation signal since it is already being used by the V5.2 interface, this bit is not used. In bits "S4", "S5" and "S6" of these Sa bits, the ID of a line to be tested over which incoming call prohibition or incoming call prohibition cancellation is exercised, are set. In bit "S8", an incoming call prohibition or incoming call prohibition cancellation command is set as binary data ("0" or "1").

As described above, according to the present invention, in an access network, an incoming call prohibition command or incoming call prohibition cancellation command can be transmitted from a remote terminal to an exchange during a speech path test, and the exchange can be controlled in such a way that an incoming call from a third party to the line to be tested can be avoided during the speech path test. Accordingly, the efficiency of the line test of the access network including a line to be tested can be improved.

What is claimed is:

1. A subscriber line test system for an access network, comprising
   incoming call prohibition control means including:
      means for monitoring a progress of a speech path test and controlling a generation of an incoming call prohibition signal and an incoming call prohibition cancellation signal;
      means for inserting an ID of a line to be tested in the incoming call prohibition signal and the incoming call prohibition cancellation signal; and
      means for generating a control message of a common channel signalling system using the incoming call prohibition signal and the incoming call prohibition cancellation signal, and
   incoming call prohibition signal detecting means including:
      means for detecting an incoming call prohibition message and an incoming call prohibition cancellation message in which the ID of a line to be tested is set;
   means for converting the incoming call prohibition message and the incoming call prohibition cancellation message to an incoming call prohibition command and an incoming call prohibition cancellation command, respectively, of an exchange; and
      means for inputting the incoming call prohibition command and the incoming call prohibition cancellation command to a monitor control unit of the exchange,
   wherein an exchange can be controlled by transmitting and receiving an incoming call prohibition signal and an incoming call prohibition cancellation signal in which messages of a common channel signalling system are used, between the incoming call prohibition control means and the incoming call prohibition signal detecting means.

2. A subscriber line test system for an access network, comprising
   incoming call prohibition control means including:
      means for monitoring a progress of a speech path test and controlling a generation of an incoming call prohibition signal and an incoming call prohibition cancellation signal;
      means for generating codes for MF signals using the incoming call prohibition signal and the incoming call prohibition cancellation signal; and
      an MF oscillator for transmitting the codes in a form of an MF signal, and incoming call prohibition signal detecting means including:
      means for detecting MF signals for incoming call prohibition and incoming call prohibition cancellation;
      means for converting the detected MF signals for incoming call prohibition and incoming call prohibition cancellation to an incoming call prohibition command and an incoming call prohibition cancellation command, respectively, of an exchange; and
      means for inputting the incoming call prohibition command and the incoming call prohibition cancellation command to a monitor control unit of the exchange; and
      communicating means for transmitting the MF signals for incoming call prohibition and incoming call prohibition cancellation which are transmitted from the incoming call prohibition control means,
   wherein an exchange can be controlled by transmitting and receiving an incoming call prohibition signal and an incoming call prohibition cancellation signal in which MF signals are used, between the incoming call prohibition control means and the incoming call prohibition signal detecting means.

3. A subscriber line test system for an access network, comprising
   incoming call prohibition control means including:
      means for monitoring a progress of a speech path test and controlling a generation of an incoming call prohibition signal and an incoming call prohibition cancellation signal;
      means for converting an ID of a line to be tested to a binary digit to insert it in three bits Sa4, Sa5 and Sa6 of an E1 frame and inserting them in the incoming call prohibition signal and the incoming call prohibition cancellation signal; and
      means for converting the incoming call prohibition signal and the incoming call prohibition cancellation signal to binary digits and generating a signal to be inserted in a Sa8 bit; and
      means for transmitting the incoming call prohibition signal, the incoming call prohibition cancellation signal and the ID of a line to be tested, and
   incoming call prohibition signal detecting means including:
      means for detecting an incoming call prohibition message and an incoming call prohibition cancellation message;
      means for converting the incoming call prohibition message and the incoming call prohibition cancellation message to an incoming call prohibition command and an incoming call prohibition cancellation command, respectively, of an exchange; and
      means for inputting the incoming call prohibition command and the incoming call prohibition cancellation command to a monitor control unit of the exchange,
   wherein an exchange can be controlled by transmitting and receiving an incoming call prohibition signal and an incoming call prohibition cancellation signal in which E1 frame bits are used, between the incoming call prohibition control means and the incoming call prohibition signal detecting means.

4. A subscriber line test apparatus for an access network in which a speech path test is carried out through an access network provided between a subscriber set and an exchange, comprising:
   incoming call prohibition control means for transmitting an incoming call prohibition instruction or an incoming call prohibition cancellation instruction through an access net;
   incoming call prohibition signal detecting means for receiving the incoming call prohibition instruction or the incoming call prohibition cancellation instruction from the incoming call prohibition control means; and
   monitor controlling means for instructing a distribution stage speech path of an exchange to exercise incoming call prohibition or incoming call prohibition cancellation, based on the incoming command instruction or incoming call prohibition cancellation instruction which is received by the incoming call prohibition signal detecting means.

5. The subscriber line test system for an access network according to claim 4, wherein said incoming call prohibition control means embeds the incoming call prohibition instruction or the incoming call prohibition cancellation instruction in a data format which is set forth in the access network and transmits it.

6. The subscriber line test system for an access network according to claim 5, wherein the data format is set forth in a V5.2 interface.

7. The subscriber line test system for an access network according to claim 6, wherein said incoming call prohibition control means transmits the incoming call prohibition instruction or the incoming call prohibition cancellation instruction using a common channel signalling system.

8. The subscriber line test system for an access network according to claim 6, wherein said incoming call prohibition control means transmits the incoming call prohibition instruction or the incoming call prohibition cancellation instruction using tone signals.

9. The subscriber line test system for an access network according to claim 6, wherein said incoming call prohibition control means transmits the incoming call prohibition instruction or the incoming call prohibition cancellation instruction using E1 frame bits.

10. The subscriber line test system for an access network according to claim 5, wherein said incoming call prohibition control means includes:

incoming call prohibition signal controlling means for generating an incoming call prohibition signal and an incoming call prohibition cancellation signal;

line ID writing means for writing an ID of a line over which incoming call prohibition or incoming call prohibition cancellation is exercised, in the incoming call prohibition signal and the incoming call prohibition cancellation signal; and an incoming call prohibition command register for temporarily storing an incoming call prohibition command or an incoming call prohibition cancellation command which is generated by the incoming call prohibition signal controlling means and the line ID writing means and transmitting these commands.

11. The subscriber line test system for an access network according to claim 5, wherein said incoming call prohibition control means includes:

incoming call prohibition signal controlling means for generating an incoming call prohibition signal and an incoming call prohibition cancellation signal; and an MF oscillator which is controlled by the incoming call prohibition signal controlling means, for outputting the incoming call prohibition signal or the incoming call prohibition cancellation signal in a form of a tone.

12. The subscriber line test system for an access network according to claim 4, wherein said incoming call prohibition signal control means includes incoming call prohibition command detecting means for detecting the received incoming call prohibition instruction or incoming call prohibition cancellation instruction as a command; and command converting means for converting the detected commands to control commands for an exchange.

* * * * *